US008757045B2

(12) United States Patent
Terauchi

(10) Patent No.: US 8,757,045 B2
(45) Date of Patent: Jun. 24, 2014

(54) WOBBLE PLATE TYPE VARIABLE DISPLACEMENT COMPRESSOR

(75) Inventor: Satoshi Terauchi, Oura-gun (JP)

(73) Assignee: Sanden Corporation, Gunma (JP)

( * ) Notice: Subject to any disclaimer, the term of this patent is extended or adjusted under 35 U.S.C. 154(b) by 253 days.

(21) Appl. No.: 12/993,446

(22) PCT Filed: Apr. 27, 2009

(86) PCT No.: PCT/JP2009/058293
§ 371 (c)(1),
(2), (4) Date: Nov. 18, 2010

(87) PCT Pub. No.: WO2009/142099
PCT Pub. Date: Nov. 26, 2009

(65) Prior Publication Data
US 2011/0070104 A1  Mar. 24, 2011

(30) Foreign Application Priority Data

May 23, 2008 (JP) .................................. 2008-135218

(51) Int. Cl.
*F01B 3/00* (2006.01)

(52) U.S. Cl.
USPC .............................................. 91/505; 417/269

(58) Field of Classification Search
USPC .............. 417/222.1, 222.2, 269; 91/504, 505;
384/295, 428, 906; 403/331, 355,
403/359.1–359.6
See application file for complete search history.

(56) References Cited

U.S. PATENT DOCUMENTS

| 1,086,783 | A | * | 2/1914 | O'Brien ........................... 384/42 |
| 3,805,552 | A | * | 4/1974 | Heald ............................. 464/162 |
| 5,055,004 | A |   | 10/1991 | Ebbing et al. |
| 5,112,197 | A |   | 5/1992 | Swain et al. |
| 5,129,752 | A | * | 7/1992 | Ebbing et al. .................... 403/24 |
| 5,167,492 | A |   | 12/1992 | Kent et al. |
| 5,509,346 | A |   | 4/1996 | Kumpf |
| 6,376,952 | B1 | * | 4/2002 | Stenta .............................. 310/90 |
| 2010/0092312 | A1 | * | 4/2010 | Tagami ........................... 417/269 |

FOREIGN PATENT DOCUMENTS

| DE | 10 2007 004 130 | 8/2007 |
| EP | 2 119 911 | 11/2009 |
| GB | 2 196 066 | 4/1988 |
| JP | 5-33762 | 2/1993 |

(Continued)

OTHER PUBLICATIONS

Machine Translation of Japanese Patent JP05-202849 to Hayase et al published on Aug. 10, 1993.*

(Continued)

*Primary Examiner* — Peter J Bertheaud
*Assistant Examiner* — Dnyanesh Kasture
(74) *Attorney, Agent, or Firm* — Cozen O'Connor

(57) ABSTRACT

A wobble plate type variable displacement compressor uses a constant velocity universal joint mechanism, which comprises an inner ring and an outer ring, balls that are held between guide grooves of the inner ring and the outer ring to transmit power, and a sleeve, which functions as a wobble central member of the wobble plate. An inner ring rotation preventing mechanism is constructed as a contoured interlock mechanism formed between the outer circumference of the inner ring and the inner circumference of a housing. A swash plate minimum inclination angle regulating mechanism, which regulates the minimum inclination angle of the swash plate by abutting the axial ends of the inner ring side and the housing side of the contoured interlock mechanism to each other, is provided to the contoured interlock mechanism.

11 Claims, 7 Drawing Sheets

(56) References Cited

FOREIGN PATENT DOCUMENTS

| JP | 05-099137 | | 4/1993 | |
| JP | 05133425 A | * | 5/1993 | ................ F16D 3/20 |
| JP | 5-202849 | | 8/1993 | |
| JP | 05-202849 | * | 8/1993 | .............. F04B 27/08 |
| JP | 2006-200405 | | 8/2006 | |
| JP | 2007-211693 | | 8/2007 | |
| JP | WO-2008069001 | * | 6/2008 | .............. F04B 27/08 |

OTHER PUBLICATIONS

Machine Translation of Japanese Patent JP05_133425 to Hayase et al published May 28, 1993.*

* cited by examiner

WOBBLE PLATE TYPE VARIABLE DISPLACEMENT COMPRESSOR

RELATED APPLICATIONS

This is a U.S. National Phase Application under 35 USC §371 of International Application PCT/JP2009/058293 filed on Apr. 27, 2009.

This application claims the priority of Japanese Patent Application No. 2008-135218 filed May 23, 2008, the entire contents of which is hereby incorporated by reference.

TECHNICAL FIELD OF THE INVENTION

The present invention relates to a wobble plate type variable displacement compressor, and specifically, to a wobble plate type variable displacement compressor which incorporates therein a new rotation preventing mechanism for the wobble plate.

BACKGROUND ART OF THE INVENTION

A wobble plate type variable displacement compressor is known wherein a rotational movement of a swash plate rotated together with a rotational main shaft and supported changeably in angle relative to the main shaft is converted into a wobble movement of a wobble plate, and by transmitting the wobble movement to a piston connected to the wobble plate, the piston is reciprocated. In such a wobble plate type variable displacement compressor, because it is necessary to prevent the rotation of the wobble plate connected to the piston, a rotation preventing mechanism of the wobble plate is incorporated. With respect to the rotation preventing mechanism of the wobble plate, various improvements for making the compressor small, improving the durability and the silent performance, facilitating processing, cost down, etc., have been investigated.

For example, in Patent documents 1, 3 and 4, a structure provided with a Birfield type constant velocity universal joint as a wobble plate rotation preventing mechanism is disclosed. In this structure, since wobble parts and a swash plate are supported by an outer ring of a Birfield type constant velocity universal joint provided as a wobble plate rotation preventing mechanism, and ultimately supported by a main shaft via a cage of an internal part of the constant velocity universal joint (a cage for regulating positions of a plurality of balls for performing power transmission), and further, via an inner ring of the constant velocity universal joint, the number of interposed parts increases and the accumulated play becomes great, and therefore, there is a problem insufficient in vibration, noise and durability.

Further, although the Birfield type constant velocity universal joint disclosed in Patent documents 1, 3 and 4 theoretically has a structure performing a rotational power transmission between inner and outer rings by a plurality of balls, actually it is difficult to achieve uniform and continuous contact of the plurality of balls, and therefore, a contact pressure of specified balls may locally increase. Further, because the rotational power transmission between inner and outer rings is performed in the shear direction of balls by ball guide grooves formed on each of inner and outer rings on both sides of a cage, the contact surface between the balls and the guide grooves may have a large inclination relative to the power transmission direction. By this, when a predetermined power is transmitted, the contact load generated as a vertical reaction force becomes high. Therefore, in order to ensure a sufficient transmission ability, it is necessary to employ a sufficiently large ball size (ball diameter), and from these reasons, it is difficult to make the structure further small-sized, and it is difficult to apply it to a small displacement compressor.

Further, since the support for the rotational main shaft of the compressor in the internal mechanism described in Patent documents 2, 3 and 4 is provided on one side relative to the main mechanism portion (a cantilever supporting is employed), whirling of the main shaft becomes great, and it is disadvantageous on durability, vibration and noise.

Further, in the compression mechanism disclosed in Patent documents 3 and 4, since the inner ring of the constant velocity universal joint is supported slidably in the axial direction at a condition being prevented with rotation, it is necessary to make the main shaft thick in order to ensure the rigidity of the main shaft provided to the housing to be sufficiently great, and it may cause increase of the weight of the main shaft and the weight of the product.

Further, in the constant velocity universal joint mechanism disclosed in Patent documents 3 and 4, machining of grooves for regulating the positions of a plurality of balls operating for power transmission is complicated, and the mechanism may be disadvantageous on cost.

Furthermore, in the compression mechanism disclosed in Patent document 2, since there is no support in the radial direction due to the main shaft in the main mechanism portion and play in the wobble portion in the radial direction tends to become great, by this play, problems on durability, vibration and noise may occur.

PRIOR ART DOCUMENTS

Patent Documents

Patent document 1: U.S. Pat. No. 5,112,197
Patent document 2: U.S. Pat. No. 5,509,346
Patent document 3: U.S. Pat. No. 5,129,752
Patent document 4: JP-A-2006-200405

SUMMARY OF THE INVENTION

Problems to be Solved by the Invention

Paying attention to the problems in the above-described conventional technologies, a wobble plate type variable displacement compressor is previously proposed by the applicant of the present invention which uses a constant velocity universal joint small-sized, good in durability and silent performance, easy-to-machine and inexpensive, that has achieved to realize uniform and continuous contact of a plurality of balls operating for power transmission while suppressing play in the radial direction and rotational direction of the inside of the constant velocity universal joint provided as a wobble plate rotation preventing mechanism (Japanese Patent Application No. 2006-327988).

In this proposal, as the rotation preventing mechanism of the wobble plate, a mechanism is provided, which comprises (a) an inner ring provided in a housing movably in an axial direction although rotation is prevented, supporting a rotational main shaft via a bearing at an inner diameter portion to rotate relatively and to move relatively in an axial direction and having a plurality of guide grooves for guiding a plurality of balls provided for power transmission, (b) a sleeve functioning as a wobble central member of the wobble movement of the wobble plate, provided on the rotational main shaft to rotate relatively thereto and to move in an axial direction and engaged with the inner ring movably in an axial direction together with the inner ring, (c) an outer ring having a plurality of guide grooves for guiding the balls at positions opposing respective guide grooves of the inner ring, supported on the sleeve wabblingly, supporting the wobble plate fixedly on an outer periphery and supporting the swash plate rotatably via a bearing, and (d) a plurality of balls held by the guide grooves formed in the inner ring and the outer ring at a condition of opposing each other and performing power transmission by being compressed between the guide grooves.

By this proposal, a wobble plate type variable displacement compressor made small-sized, good in durability and silent performance, easy-to-machine and inexpensive, has become possible, but, even in this proposed mechanism, matters to be further improved, in particular, matters to be further improved with respect to a minimum displacement regulating structure and a inner ring rotation regulating structure of the wobble plate type variable displacement compressor, are still left. Namely, with respect to the regulation of the minimum inclination angle of the swash plate, in a usual known swash plate type variable displacement compressor, the minimum inclination angle is regulated by a structure where a pin of a hinge mechanism connecting the swash plate at a condition capable of changing the inclination angle thereof is abutted to an end surface of a slot of a side of a rotor rotated integrally with a rotational main shaft. In such a mechanism, however, because the accuracy of parts greatly influences the regulation of the minimum inclination angle of the swash plate and the number of the interposed parts is great, the accuracy for the regulation may become slightly bad. Therefore, when such a known swash plate minimum inclination angle regulating structure is applied to the above-described newly proposed wobble plate type variable displacement compressor as it is, improvement of the accuracy for the swash plate minimum inclination angle regulation cannot be expected.

Further, in the above-described newly proposed wobble plate type variable displacement compressor, it is necessary to support the above-described inner ring movably in an axial direction while the rotation of the inner ring in the housing is prevented. As a structure for regulating such a rotation of the inner ring, a mechanism using a spline mechanism is known, and it is considered that a spline is defined on the inner circumferential surface of the housing, and a spline of a key corresponding therewith is provided on the outer circumferential surface of the inner ring, thereby preventing the rotation of the inner ring. However, in case where the spline is defined directly on the inner circumferential surface of the housing, there is a fear of an abrasion of the spline portion.

Accordingly, paying attention to the problems left in the above-described new wobble plate type variable displacement compressor using a specified constant velocity universal joint mechanism which was previously proposed by the applicant of the present invention, an object of the present invention is to improve the accuracy of swash plate minimum inclination angle regulation and to realize this at a section of an inner ring supporting mechanism.

Further, desirably, paying attention to another problem left in the inner ring supporting mechanism section of the above-described new wobble plate type variable displacement compressor, another object of the present invention is to improve the abrasion resistance of the inner ring rotation preventing mechanism.

Means for Solving the Problems

To achieve the above-described objects, a wobble plate type variable displacement compressor according to the present invention has pistons inserted reciprocally into cylinder bores, a swash plate rotated together with a rotational main shaft and supported changeably in angle relative to the main shaft, a wobble plate which is connected to the pistons, in which a rotational movement of the swash plate is converted into a wobble movement of the wobble plate, and which transmits the wobble movement to the pistons to reciprocate the pistons, and a rotation preventing mechanism of the wobble plate, and is characterized in that the rotation preventing mechanism of the wobble plate comprises (a) an inner ring provided in a housing movably in an axial direction while being prevented with rotation via an inner ring rotation preventing mechanism, supporting said rotational main shaft via a bearing at an inner diameter portion to rotate relatively and to move relatively in an axial direction and having a plurality of guide grooves for guiding a plurality of balls provided for power transmission, (b) a sleeve functioning as a wobble central member of the wobble movement of the wobble plate, provided on the rotational main shaft to rotate relatively thereto and to move in an axial direction and engaged with the inner ring movably in an axial direction together with the inner ring, (c) an outer ring having a plurality of guide grooves for guiding the balls at positions opposing respective guide grooves of the inner ring, supported on the sleeve wabblingly, and connected with the wobble plate on an outer circumference side of the outer ring, and (d) a plurality of balls held by the guide grooves formed in the inner ring and the outer ring at a condition of opposing each other and performing power transmission by being compressed between the guide grooves, the inner ring rotation preventing mechanism formed in the housing is constructed as a contoured interlock mechanism formed between an outer circumference of the inner ring and an inner circumference of the housing, and a swash plate minimum inclination angle regulating mechanism, which regulates a minimum inclination angle of the swash plate by abutting axial terminal ends of inner ring side and housing side of the contoured interlock mechanism to each other, is provided to the contoured interlock mechanism. Where, the outer ring may be structured so as to rotatably support the swash plate via a bearing. Alternatively, the swash plate may be structured so as to be supported rotatably by the wobble plate via a bearing.

In the rotation preventing mechanism of the wobble plate thus constructed, first, by the structure where the outer ring of the rotation preventing mechanism is supported wabblingly by the sleeve and the sleeve is supported rotatably and movably in the axial direction relative to the rotational main shaft, it becomes possible to make play in the radial direction between the rotational main shaft and the whole of the wobble mechanism portion small, and increase of reliability and reduction of vibration and noise may become possible. Further, the inner ring is supported in the housing movably in the axial direction and prevented with rotation, and by the bearing provided in the inner diameter portion of this inner ring, the rotational main shaft, for example, the rear end portion of the rotational main shaft, is supported. Therefore, the rotational main shaft is rotatably supported at both sides of the compression main mechanism portion (that is, inboard type supporting), a sufficiently high rigidity can be easily ensured, the whirling of the main shaft may be suppressed small, and therefore, it becomes possible to make the diameter of the main shaft small, improve the reliability and reduce vibration and noise. Further, because the whirling of the main shaft is suppressed, the deflection of the swash plate rotated together with the main shaft may be suppressed small, and the rotational balance of the whole of the rotational portion may be improved. Further, by optimizing the formation of the guide grooves formed on the inner ring and the outer ring which oppose each other, uniform and continuous contact of the balls held between the guide grooves becomes possible, and therefore, it becomes possible to improve the reliability and reduce vibration and noise. Furthermore, the guide grooves of balls may be formed so that balls can roll between a pair of guide grooves separated from each other accompanying with the movement of the intersection of both guide grooves, complicated shapes are not required for the guide grooves themselves, and therefore, the machining therefor is facilitated and becomes advantageous on cost. In such a structure according to the present invention, basically, the plurality of balls operating for power transmission perform power transmission at a condition where they are nipped and supported between guide grooves facing to each other in the compression direction. By this, an actual contact area can be ensured sufficiently large, it becomes possible to reduce the contact surface pressure, and it becomes advantageous on reliability. Further, because the contact surface pressure can be reduced, it becomes possible to make the diameter of balls small and it becomes also possible to make the whole of the wobble plate rotation preventing mechanism small-sized.

Then, by the structure in which the above-described inner ring rotation preventing mechanism is constructed as a contoured interlock mechanism formed between an outer circumference of the inner ring and an inner circumference of the housing, and a swash plate minimum inclination angle regulating mechanism, which regulates a minimum inclination angle of the swash plate by abutting axial terminal ends of inner ring side and housing side of the contoured interlock mechanism to each other, is provided to the contoured interlock mechanism, it becomes unnecessary to regulate the minimum inclination angle of the swash plate at a hinge mechanism portion, which connect the swash plate at a condition capable of changing the angle of the swash plate, as in a conventional usual swash plate type variable displacement compressor. In the above-described swash plate minimum inclination angle regulating mechanism due to the abutting of the axial terminal ends to each other in the contoured interlock mechanism, because the number of interposed parts may be small, it can be easily achieved to improve the accuracy for the swash plate minimum inclination angle regulation.

In the contoured interlock mechanism as an inner ring rotation preventing mechanism capable of constructing a high-accuracy swash plate minimum inclination angle regulating mechanism by the above-described simple structure in this wobble plate type variable displacement compressor according to the present invention, it is possible to improve the abrasion resistance of the inner ring rotation preventing mechanism while constructing a desirable swash plate minimum inclination angle regulating mechanism.

For example, in the above-described wobble plate type variable displacement compressor according to the present invention, a structure may be employed wherein the above-described contoured interlock mechanism is constructed by defining at least one groove extending in an axial direction on the outer circumference of the inner ring and providing a pin-like member, extending in an axial direction in correspondence with the groove, to the inner circumference of the housing, and the swash plate minimum inclination angle regulating mechanism is constructed by a structure wherein a tip of the pin-like member and a terminal end of the groove are abutted to each other.

Alternatively, a structure may also be employed wherein the contoured interlock mechanism is constructed by defining at least one hole extending in an axial direction in the inner ring and providing a pin-like member, extending in an axial direction in correspondence with the hole, to the housing, and the swash plate minimum inclination angle regulating mechanism is constructed by a structure wherein a tip of the pin-like member and a terminal end of the hole are abutted to each other. In this structure and the above-described structure, since, while the inner ring is held movably in the axial direction, the mechanism for preventing the rotation of the inner ring is constructed as a contact mechanism between the pin-like member and the groove or the hole, a large contact area can be ensured, and the abrasion resistance can be improved. It is possible to employ a structure wherein the above-described pin-like member is provided to a member fixed in the housing which is different from the housing.

Alternatively, a structure may also be employed wherein the contoured interlock mechanism is constructed by forming at least one concave portion or convex portion extending in an axial direction on the outer circumference of the inner ring and providing a convex portion or concave portion, extending in an axial direction in correspondence with the concave portion or convex portion of inner ring side, to the inner circumference of the housing, and the swash plate minimum inclination angle regulating mechanism is constructed by a structure wherein terminal ends of both concave/convex portions are abutted to each other. In this structure, it becomes possible to simplify the structure of the inner ring rotation preventing mechanism rather than to improve the abrasion resistance.

Alternatively, a structure may also be employed wherein the contoured interlock mechanism is constructed by forming at least one flat surface portion extending in an axial direction on the outer circumference of the inner ring and providing a flat surface portion, extending in an axial direction in correspondence with the flat surface portion of inner ring side, to the inner circumference of the housing, and the swash plate minimum inclination angle regulating mechanism is constructed by a structure wherein terminal ends of both flat surface portions are abutted to each other. In this structure, since the inner ring rotation preventing mechanism is formed by abutting of the flat surfaces to each other, a large contact area can be ensured, the abrasion resistance can be improved, and in addition, the structure of the inner ring rotation preventing mechanism can also be simplified.

In the above-described wobble plate type variable displacement compressor according to the present invention, a structure may also be employed wherein a shaft end supporting member is provided in the above-described housing for supporting an inner ring-side shaft end of the rotational main shaft in an axial direction. As the shaft end supporting member, for example, an adjusting screw, a plane bearing, a thrust bearing, etc. can be used.

Further, a structure may also be employed wherein a spring is interposed between axially confronting surfaces of sides of the inner ring and the housing for urging the inner ring in a direction for increasing an inclination angle of the swash plate. In case where such a spring is interposed, when the inner ring is returned from the position corresponding to the swash plate minimum inclination angle to the position in a direction for increasing the swash plate inclination angle, its start of the movement is facilitated.

In such a wobble plate type variable displacement compressor according to the present invention, it is possible to employ a structure wherein the outer ring and the wobble plate in the above-described wobble plate rotation preventing mechanism are formed integrally. By this integration, it becomes possible to further decrease the number of parts, and it becomes advantageous also in cost for manufacture and assembly.

Further, a structure may be employed wherein the guide grooves opposing each other of the inner ring and the outer ring of the above-described wobble plate rotation preventing mechanism are formed at a relative angle of 30 to 60 degrees relative to a center axis of the rotational main shaft, and guide grooves opposing each other for forming a single ball guide are disposed so as to be symmetric relative to a plane perpendicular to the main shaft and passing through a wobble center of the wobble plate at a condition where a relative angle between an axis of the inner ring and an axis of the outer ring is zero. By the structure where the guide grooves opposing each other are disposed at a crossed axes angle within a predetermined range and both guide grooves formed in the directions crossed with each other are disposed symmetrically relative to the plane passing through the wobble center of the wobble plate, it becomes possible that the balls held between the guide grooves are brought into contact with both guide grooves at a uniform and continuous condition, the vibration and noise at this portion may be greatly reduced, and the reliability may be greatly improved.

Further, in this constitution, a structure may be employed wherein two ball guides adjacent to each other among a plurality of ball guides of the above-described wobble plate rotation preventing mechanism are referred to be a pair of ball guides, and the pair of ball guides are disposed in parallel to each other. By such a structure, because the play in the rotational direction in the wobble plate rotation preventing mechanism portion is schematically decided by a relationship between the distance between the bottoms of the pair of guide grooves provided on the inner and outer rings and the diameter of the balls, setting and management of an actual clearance between the bottoms of the guide grooves and the balls are facilitated, and it becomes possible to suppress the play to be small by setting a proper clearance.

In this constitution, a structure may be employed wherein the pair of ball guides disposed in parallel to each other are disposed symmetrically relative to a plane including a center axis of the rotational main shaft, and a structure also may be employed wherein a guide groove forming one ball guide of the pair of ball guides, which are disposed in parallel to each other, is disposed so that its axis is positioned on a plane including a center axis of the rotational main shaft. In the former structure, a wobble plate rotation preventing mechanism, in which a rotational direction may not be selected, can be formed, and it becomes possible to reduce the contact load of the balls, and in the latter structure, it becomes possible to further reduce the contact load by setting the power transmission direction at a specified direction.

Further, in the above-described wobble plate rotation preventing mechanism, a structure may be employed wherein two ball guides disposed on both sides of the rotational main shaft approximately symmetrically relative to the rotational main shaft among the plurality of ball guides are referred to be a pair of ball guides, and the pair of ball guides are disposed in parallel to each other. By this structure, because the play in the rotational direction in the wobble plate rotation preventing mechanism portion is schematically decided by a relationship between the distance between the bottoms of the pair of guide grooves provided on the inner and outer rings and the diameter of the balls, it becomes possible to set and manage actual clearances in both ball guides simultaneously at desirable clearances, by disposing two ball guides symmetrically disposed in parallel to each other. As a result, the setting and management of the clearances are facilitated, and it becomes possible to suppress the play to be small.

In this structure, it is preferred that the above-described pair of ball guides, which are disposed in parallel to each other, are disposed so that axes of guide grooves forming the pair of ball guides are positioned on a plane including a center axis of the rotational main shaft. By disposing the pair of ball guides on the plane including the center axis of the rotational main shaft, it becomes possible to minimize the ball contact load without selecting the power transmission direction.

Effect According to the Invention

Thus, in the wobble plate type variable displacement compressor according to the present invention, as compared with the wobble plate rotation preventing mechanism using the conventional constant velocity universal joint, uniform and continuous contact of a plurality of balls operating for power transmission can be achieved while the play can be suppressed small, a rotation preventing mechanism small-sized, excellent in durability and silent performance, good in rotational balance, easy in machining and inexpensive can be realized, and a wobble plate type variable displacement compressor, having an excellent performance which has not been achieved by the conventional technologies, can be provided. And, by constructing the inner ring rotation preventing mechanism of this compressor as the contoured interlock mechanism formed between the outer circumference of the inner ring and the inner circumference of the housing and providing the swash plate minimum inclination angle regulating mechanism, which regulates the minimum inclination angle of the swash plate by abutting the axial terminal ends of the inner ring side and the housing side to each other, to this contoured interlock mechanism, the number of interposed parts can be decreased and the accuracy for regulating the swash plate minimum inclination angle can be improved. Further, by constructing the inner ring rotation preventing mechanism, formed by this contoured interlock mechanism, by a fitting structure between the pin-like member and the groove or hole, the abrasion resistance of the inner ring rotation preventing mechanism portion can also be improved.

BRIEF EXPLANATION OF THE DRAWINGS

FIG. 4(A) is a partial, vertical sectional view thereof, and FIG. 4(B) is a partial elevational view thereof.

8(A) is a vertical sectional view of the device showing a state at a swash plate minimum inclination angle and FIG. 8(B) is a vertical sectional view of the device showing a state at a swash plate maximum inclination angle.

EMBODIMENTS FOR CARRYING OUT THE INVENTION

Hereinafter, embodiments of the present invention will be explained referring to figures.

First, an embodiment of the whole structure of a wobble plate type variable displacement compressor according to the present invention will be explained referring to FIGS. 1-5, and next, based on the structure, referring to FIGS. 6-11, embodiments of structures for improving swash plate minimum inclination angle regulating mechanism and inner ring rotation preventing mechanism will be explained.

Figure 1:
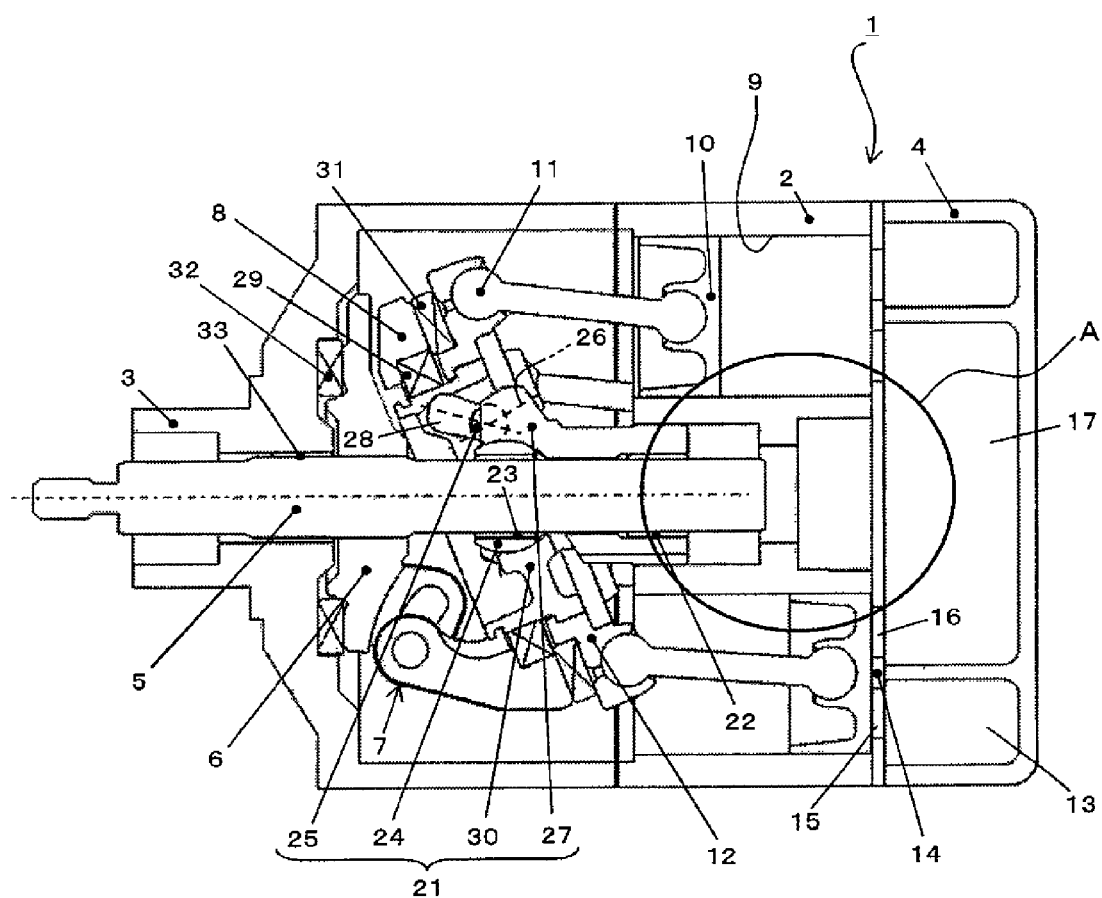
FIG. 1 is a vertical sectional view showing a basic structure of a wobble plate type variable displacement compressor according to an embodiment of the present invention.
Figure 2:
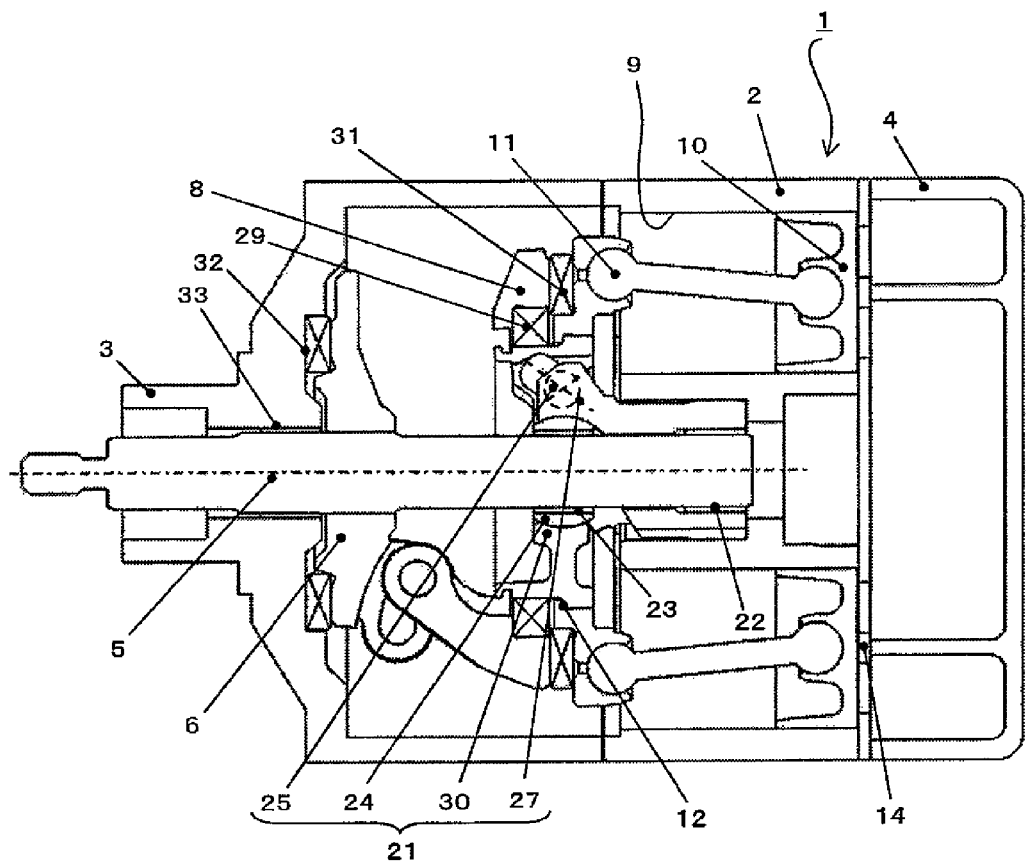
FIG. 2 is a vertical sectional view of the wobble plate type variable displacement compressor depicted in FIG. 1, showing an operational condition different from that depicted in FIG. 1.
Figure 3:
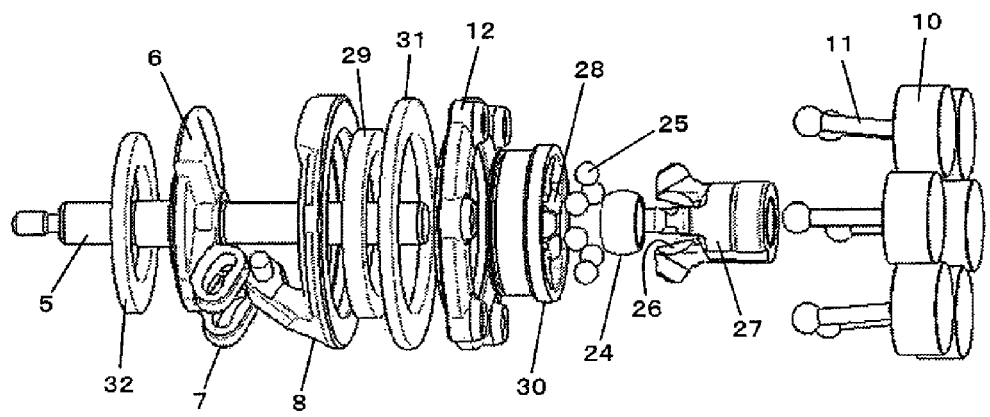
FIG. 3 is an exploded perspective view of a main portion including a wobble plate rotation preventing mechanism of the wobble plate type variable displacement compressor depicted in FIG. 1.

FIG. 1 shows an example of a basic structure of the whole of a wobble plate type variable displacement compressor according to the present invention, and shows its entire structure in the operation state at the condition of the displacement achieving its maximum discharge. FIG. 2 shows the operation state of the wobble plate type variable displacement compressor depicted in FIG. 1 at the condition of the displacement achieving its minimum discharge. FIG. 3 shows a main portion including a wobble plate rotation preventing mechanism in the wobble plate type variable displacement compressor depicted in FIG. 1 as an exploded perspective view.

In FIGS. 1 and 2, a wobble plate type variable displacement compressor 1 has a housing 2 disposed at the central portion, a front housing 3 and a rear housing 4 disposed on both sides of the housing 1 as its housings, and a rotational main shaft 5 inputted with a rotational drive power from outside is provided over the range from the portion of housing 2 up to the position extending through front housing 3. A rotor 6 is fixed to rotational main shaft 5 so as to be rotated integrally with main shaft 5, and a swash plate 8 is connected to rotor 6 via a hinge mechanism 7, changeably in angle and rotatably together with rotational main shaft 5. Piston 10 is reciprocally inserted into each cylinder bore 9, and piston 10 is connected to wobble plate 12 via connecting rod 11. The rotational movement of swash plate 8 is converted into the wobble movement of wobble plate 12, the wobble movement is transmitted to piston 10 via connecting rod 11, and piston 10 is reciprocated. Fluid to be compressed (for example, refrigerant) is sucked from suction chamber 13 formed in rear housing 4 into cylinder bore 9 through suction hole 15 formed on valve plate 14 (a suction valve is omitted in the figure) accompanying with the reciprocating movement of piston 10, and after the sucked fluid is compressed, the compressed fluid is discharged into discharge chamber 17 through discharge hole 16 (a discharge valve is omitted in the figure), and therefrom, sent to an external circuit.

It is necessary that the above-described wobble plate 12 performs a wobble movement at a condition where its rotation is prevented. Hereinafter, the remaining portions of compressor 1 will be explained mainly with respect to the rotation preventing mechanism of this wobble plate 12, referring to FIGS. 1 to 3.

Rotation preventing mechanism 21 of wobble plate 12 is formed from a mechanism comprising (a) an inner ring 27 provided in housing 2 movably in the axial direction although its rotation is prevented, supporting rotational main shaft 5 via a bearing 22 (radial bearing) at its inner diameter portion to rotate relatively and to move relatively in the axial direction and having a plurality of guide grooves 26 for guiding a plurality of balls 25 provided for power transmission, (b) a sleeve 24 functioning as a wobble central member of the wobble movement of wobble plate 12, provided on rotational main shaft 5 to rotate relatively thereto and to move in the axial direction and engaged with inner ring 27 movably in the axial direction together with inner ring 27, (c) an outer ring 30 having a plurality of guide grooves 28 for guiding balls 25 at positions opposing respective guide grooves 26 of inner ring 27, supported on sleeve 24 wabblingly, connected with wobble plate 12 fixedly on its outer circumference and supporting swash plate 8 rotatably via a bearing 29 (radial bearing), and (d) a plurality of balls 25 held by guide grooves 26, 28 formed in inner ring 27 and outer ring 30 at a condition of opposing each other and performing power transmission by being compressed between guide grooves 26, 28. Thrust bearings 31, 32 are interposed between wobble plate 12 and swash plate 8 and between rotor 6 and front housing 3, respectively. Further, although inner ring 27 is supported in housing 9 movably in the axial direction, its rotation is prevented via an inner ring rotation preventing mechanism. As the inner ring rotation preventing mechanism, a general rotation regulating means such as a key or a spline may be used (not depicted). Furthermore, although the rear end of rotational main shaft 5 is supported by bearing 22 provided on the inner diameter portion of inner ring 27, because rotational main shaft 5 is supported also at the side of front housing 3 through the compression main mechanism portion rotatably via bearing 33 (radial bearing), it is radially supported on both sides (inboard supporting).

In rotation preventing mechanism 21 of wobble plate 12 constructed as described above, outer ring 30 is wabblingly supported by sleeve 24 through the spherical surface contact, and sleeve 24 is supported by rotational main shaft 5 rotatably and movably in the axial direction, and by this structure, it is possible to make play in the radial direction between rotational main shaft 5 and the whole of the wobble mechanism portion small, thereby improving the reliability and reducing vibration and noise.

Further, in the above-described embodiment, since rotational main shaft 5 is supported in the condition of inboard supporting on both sides of the compression main mechanism portion by bearing 22 provided in the inner diameter portion of inner ring 27 and bearing 33 provided on front housing 3 side, a sufficiently high rigidity can be ensured even if the diameter of main shaft 5 is relatively small, the whirling of main shaft 5 can also be suppressed, making small-sized can be easily achieved, and improvement of reliability and reduction of vibration and noise may be possible. Further, as the result of suppressing the whirling of rotational main shaft 5, the whole of the rotational portion rotated together with rotational main shaft 5 can be suppressed to be small, and therefore, the rotational balance of the whole of the rotated portion becomes remarkably good. Where, in the above-described structure, it is possible to extend rotational main shaft 5 rearward and to replace it for a structure being supported directly by housing 2 via a bearing.

Moreover, in the above-described embodiment, by the engagement of the spherical surface (concave spherical surface) formed in the inner diameter side of inner ring 27 with the spherical surface (convex spherical surface) formed in the outer diameter side of sleeve 24, a mutual supporting between both members is performed. By adjusting a clearance in this supporting portion, it is possible to absorb a relative whirling of the inner and outer rings caused by the dispersion of the positions of the guide grooves for a plurality of balls operating for power transmission, whereby the uniform and continuous contact of balls 25 is further improved, and it is more advantageous with respect to reliability, vibration and noise.

Where, although outer ring 30 and wobble plate 12 are formed as separate members and they are fixed to each other in the above-described embodiment, it is possible to form them integrally. By this integration, the number of parts may be further decreased, and the assembly may be facilitated.

Figure 4:
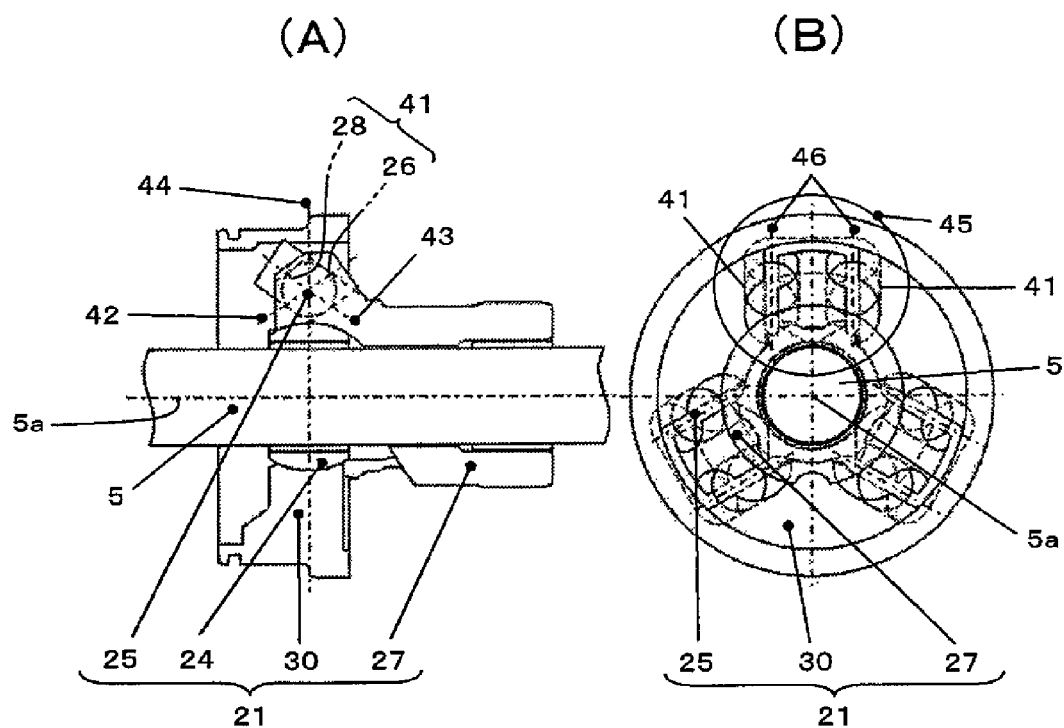
FIG. 4 shows an example of the structure of the wobble plate type variable displacement compressor depicted in FIG. 1.

FIG. 4 shows a condition where the relative angle between the inner and outer rings is zero in rotation preventing mechanism 21 of wobble plate 12. As depicted in FIG. 4(A), guide grooves 26, 28 formed on inner ring 27 and outer ring 24 of wobble plate rotation preventing mechanism 21 are disposed at relative angles (relative angles within a range of 30 to 60 degrees) relative to the center axis of rotational main shaft 5. Guide groove 26 formed on inner ring 27 (the axis of guide groove 26 is indicated by symbol 42) and guide groove 28 formed on outer ring 30 (the axis of guide groove 28 is indicated by symbol 43), which form one ball guide 41 and oppose each other, are disposed so as to be symmetric relative to plane 44 which is perpendicular to rotational main shaft 5 and passes through the wobble center of wobble plate 12, at a condition where the relative angle between the axis of inner ring 27 and the axis of outer ring 30 is zero. Ball 25 is regulated and supported on the intersection of axis 42 of guide groove 26 and axis 43 of guide groove 28. Further, as depicted in FIG. 4(B), a structure can be employed wherein two ball guides adjacent to each other among a plurality of ball guides 41 of wobble plate rotation preventing mechanism 21 are referred to be a pair of ball guides, and respective ball guides 41 in the pair of ball guides 45, in other words, axes 46 of the guide grooves formed on the inner and outer rings in this portion, are disposed in parallel to each other. In such a structure, as aforementioned, because the play in the rotational direction in the wobble plate rotation preventing mechanism portion is schematically decided by a relationship between the distance between the bottoms of the pair of guide grooves provided on the inner and outer rings and the diameter of the balls, setting and management of an actual clearance are facilitated, and it becomes possible to suppress the play to be small by setting a proper clearance. A plurality of balls 25 operating for power transmission are supported in the compression direction between guide grooves 26, 28 facing each other through the respective balls, and perform power transmission. Since ball 25 is held by guide grooves 26, 28 facing each other so as to be embraced and come into contact with both guide grooves 26, 28, the contact area between ball and the respective guide grooves 26, 28 may be ensured to be sufficient large, it becomes possible to reduce the contact surface pressure, and a structure remarkably advantageous in reliability, vibration and silent performance may be realized. Further, it is also possible to make the diameter of balls 25 small, and the whole of the wobble plate rotation preventing mechanism may be made small.

Figure 5:
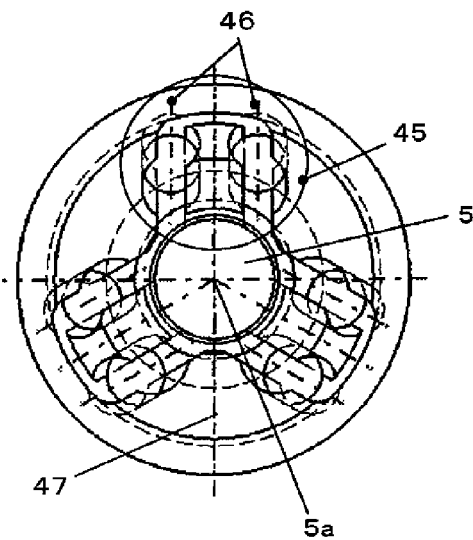
FIG. 5 is a partial elevational view showing another example of the structure of the wobble plate type variable displacement compressor depicted in FIG. 1.

Further, the load applied to ball, which is provided as a moment whose center is rotational main shaft 5, is generated as a perpendicular reaction force of the actual contact surface. The smaller the inclination of the normal line of the contact surface relative to the direction of the moment is, the smaller the contact load becomes, and as depicted in FIG. 5, by a structure where the pair of ball guides 45 disposed in parallel as described above are disposed symmetrically relative to plane 47 including center axis 5a of rotational main shaft 5, in other words, by a structure where axes 46 of two sets of guide grooves formed on the inner and outer rings are disposed symmetrically relative to plane 47 including center axis 5a of rotational main shaft 5, the mechanism is made as a wobble plate rotation preventing mechanism which does not select the rotational direction, and it is possible to minimize the ball contact load.

In the above-described wobble plate type variable displacement compressor, at a portion A shown in FIG. 1, the rotation preventing mechanism of inner ring 27 formed in housing 2 is constructed as a contoured interlock mechanism formed between the outer circumference of inner ring 27 and the inner circumference of housing 2, and to the contoured interlock mechanism, a swash plate minimum inclination angle regulating mechanism, which regulates a minimum inclination angle of swash plate 8 by abutting axial terminal ends of inner ring side and housing side of the contoured interlock mechanism to each other, is provided. These mechanisms will be explained referring to FIGS. 6-11.

Figure 6:
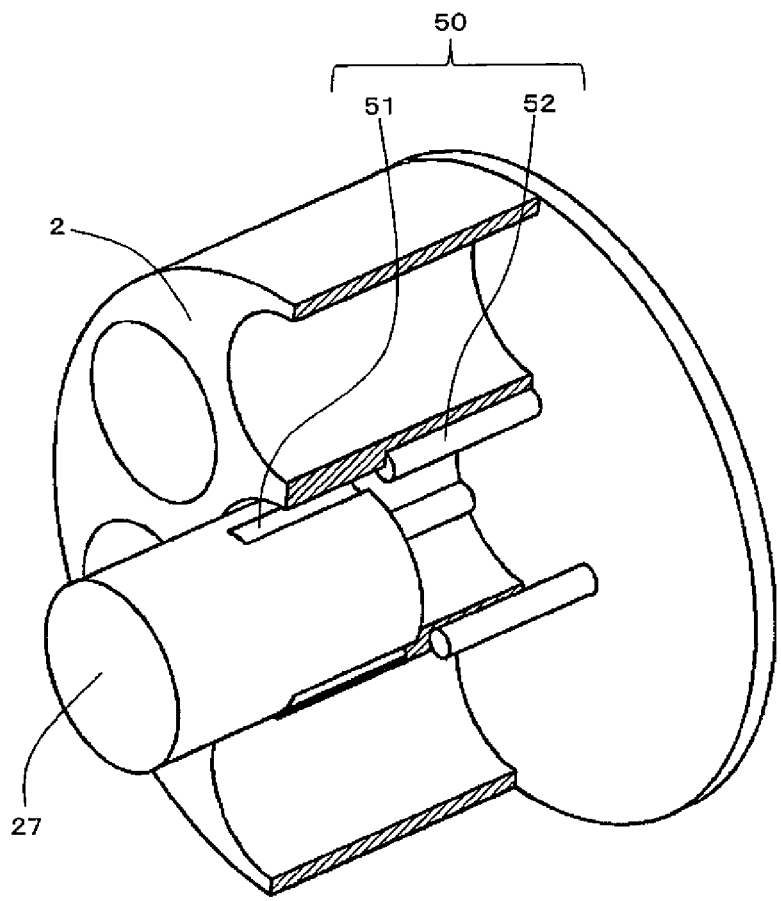
FIG. 6 is a partial perspective view of a wobble plate type variable displacement compressor, showing an example of an inner ring rotation preventing mechanism and a swash plate minimum inclination angle regulating mechanism in the present invention.
Figure 7:
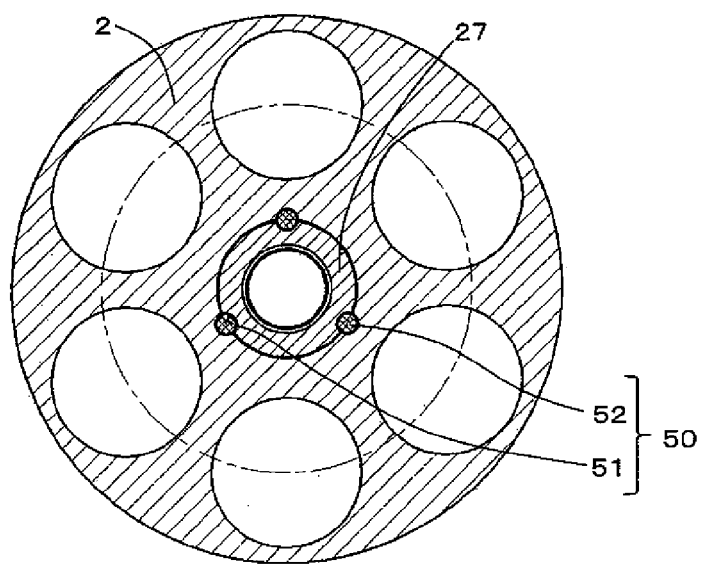
FIG. 7 is a cross-sectional view of the device depicted in FIG. 6.
Figure 8:
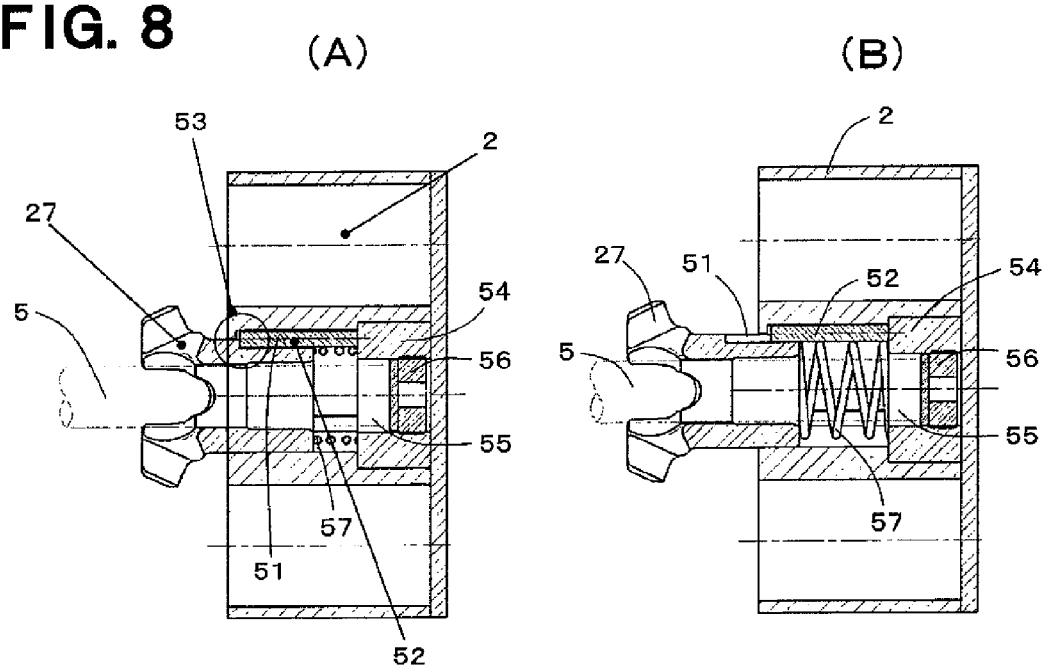
FIG. 8 shows a case where a shaft end supporting member and a spring are added to the device depicted in FIG. 6, FIG.

In the structure shown in FIGS. 6 and 7, contoured interlock mechanism 50 forming the rotation preventing mechanism of inner ring 27 is constructed by defining at least one groove 51 (in this embodiment, three grooves) extending in an axial direction on the outer circumference of inner ring 27 and providing a pin-like member 52, extending in an axial direction in correspondence with the groove 51, to the inner circumference of housing 2. By a structure where each pin-like member 52 is fitted into each groove 51, inner ring 27 is held free to slide in the axial direction relative to pin-like member 52 and housing 2, and the rotation of inner ring 27 is prevented. The swash plate minimum inclination angle regulating mechanism is constructed as follows. As shown in FIG. 8 with states at a time of a condition of a swash plate minimum inclination angle (FIG. 8 (A)) and at a time of a condition of a swash plate maximum inclination angle (FIG. 8 (B)), in a condition of swash plate minimum inclination angle, a swash plate minimum inclination angle regulating mechanism 53 is constructed by a structure wherein a tip of pin-like member 52 and a terminal end of groove 51 are abutted to each other. In such a swash plate minimum inclination angle regulating mechanism 53 due to abutting of the axial terminal ends of pin-like member 52 and groove 51 to each other, because the number of interposed parts may be small, the accuracy for regulating the swash plate minimum inclination angle can be easily improved. Further, since contoured interlock mechanism 50 forming the rotation preventing mechanism of inner ring 27 is constructed as a contact mechanism between pin-like member 52 and groove 51, the contact area can be ensured to be great, and it becomes possible to improve the abrasion resistance in the inner ring rotation preventing mechanism. Where, as aforementioned, instead of contoured interlock mechanism 50 formed by pin-like member 52 and groove 51, it is possible to construct a contoured interlock mechanism by defining at least one hole (not depicted) extending in an axial direction in inner ring 27 and providing a pin-like member (not depicted), inserted into the hole and extending in an axial direction in correspondence with the hole, to housing 2. Further, a structure may also be employed wherein the above-described pin-like member 52 is provided to a member 54, for example as shown in FIG. 8, fixed in housing 2, which is different from the housing 2.

Further in this embodiment, as shown in FIG. 8, a shaft end supporting member 56 is provided in housing 2 for supporting an inner ring-side shaft end 55 of rotational main shaft 5 in an axial direction. The shaft end supporting member 56 can be easily provided, for example, by cutting a screw in advance in the inside of inner ring 27 or the above-described member 54. As aforementioned, as shaft end supporting member 56, for example, an adjusting screw for adjusting the position of the shaft end of rotational main shaft 5, a plane bearing, a thrust bearing, etc. can be employed. By providing such a shaft end supporting member 56, the position of the shaft end of the rotational main shaft can be decided precisely at a predetermined position.

Further, as shown in FIG. 8, a spring 57 for urging inner ring 27 in a direction for increasing the swash plate inclination angle is interposed between axially confronting surfaces of the inner ring side and the housing side. By adding spring 57, the rising property at the time of returning inner ring 27 in the direction for increasing the swash plate inclination angle can be ensured to be good.

Figure 9:
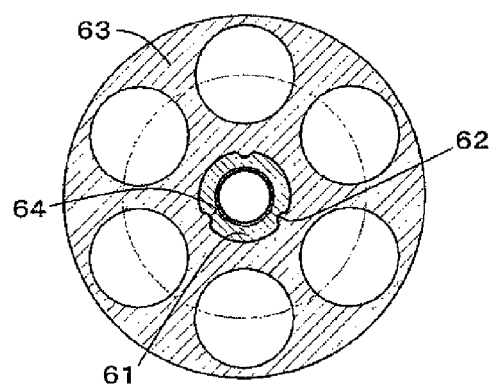
FIG. 9 is a cross-sectional view showing an inner ring rotation preventing mechanism different from that depicted in FIG. 7.

Further, in the present invention, it is possible to employ another structure as the above-described contoured interlock mechanism formed as an inner ring rotation preventing mechanism capable of forming a high-accuracy swash plate minimum inclination angle regulating mechanism by a simple structure. For example, as shown in FIG. 9, a contoured interlock mechanism can be constructed by forming at least one concave portion or convex portion (in the figure, three concave portions 62) extending in an axial direction on the outer circumference of inner ring 61 and providing a convex portion or concave portion (in the figure, convex portion 64), extending in an axial direction in correspondence with the concave portion or convex portion (in the figure, concave portion 62) of the inner ring side, to the inner circumference of housing 63. In this case, the swash plate minimum inclination angle regulating mechanism is constructed by a structure wherein terminal ends of both concave/convex portions are abutted to each other.

Figure 10:
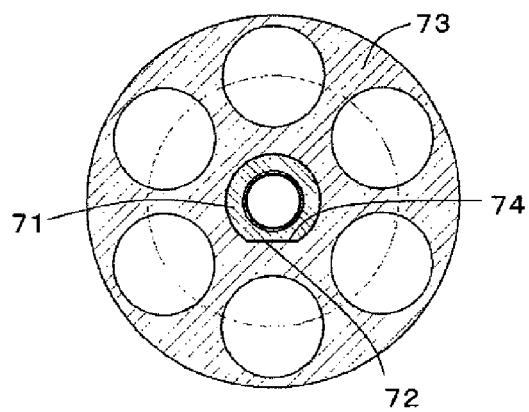
FIG. 10 is a cross-sectional view showing an inner ring rotation preventing mechanism further different from that depicted in FIG. 7.

Further, for example, as shown in FIG. 10, a contoured interlock mechanism can be constructed by forming at least one flat surface portion 72 extending in an axial direction on the outer circumference of inner ring 71 and providing a flat surface portion 74, extending in an axial direction in correspondence with the flat surface portion 72 of the inner ring side, to the inner circumference of housing 73. In this case, the swash plate minimum inclination angle regulating mechanism is constructed by a structure wherein terminal ends of both flat surface portions 72, 74 are abutted to each other. In this structure, since the inner ring rotation preventing mechanism is constructed by the contact of flat surface portions 72, 74 with each other, the contact area can be ensured to be large, the abrasion resistance can be improved, and simplification of the structure for the inner ring rotation preventing mechanism may be expected.

Figure 11:
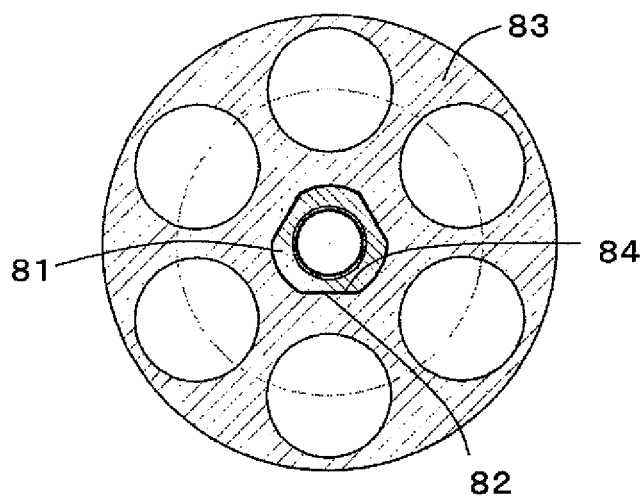
FIG. 11 is a cross-sectional view showing an inner ring rotation preventing mechanism according to a modification of the mechanism depicted in FIG. 10.

In the above-described inner ring rotation preventing mechanism due to the contact of the flat surface portions with each other, for example, as shown in FIG. 11, a contoured interlock mechanism also can be constructed by forming a plurality of (in the figure, three) flat surface portions 82 each extending in an axial direction on the outer circumference of inner ring 81 and providing flat surface portions 84, extending in an axial direction in correspondence with the respective flat surface portions 82 of the inner ring 81 side, to the inner circumference of housing 83. Since a plurality of inner ring rotation preventing mechanisms due to the contact of the flat surface portions with each other are formed in the circumferential direction, the rotation of inner ring 81 can be prevented more securely, and a further improvement of the abrasion resistance can be expected.

Figure 12:
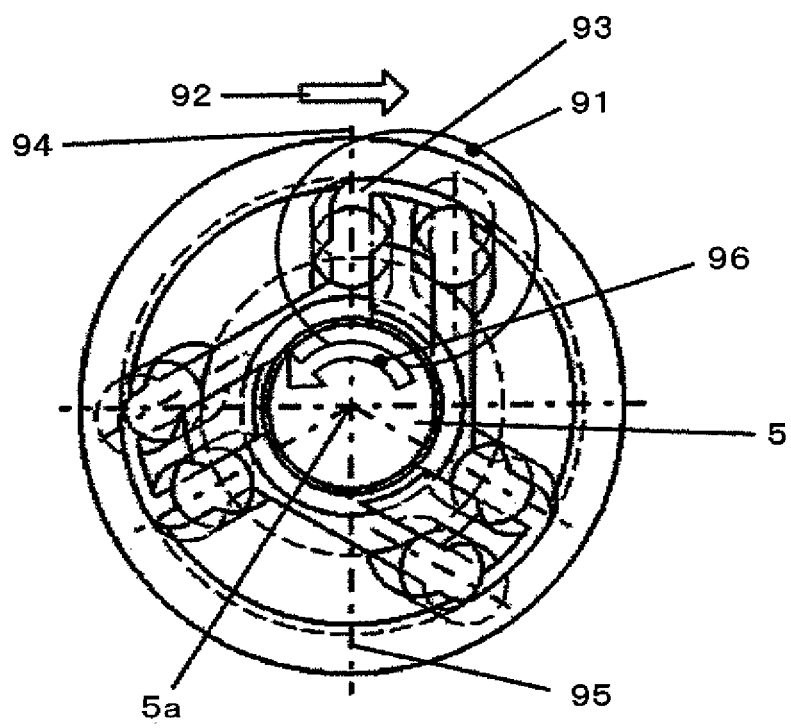
FIG. 12 is a partial elevational view showing a further example of the structure of the wobble plate type variable displacement compressor depicted in FIG. 1.

Further, in the present invention, as an embodiment other than the embodiment depicted in FIGS. 1-5, for example, as depicted in FIG. 12, by offsetting one ball guide 93 mainly operating in power transmission direction of outer ring 92 among the pair of ball guides 91, in other words, axis 94 of the guide groove in the ball guide 93, onto plane 95 including center axis 5a of rotational main shaft 5, it is possible to further reduce the contact load in the specified restricted power transmission direction. Where, in FIG. 12, arrow 96 indicates power transmission direction of inner ring.

Figure 13:
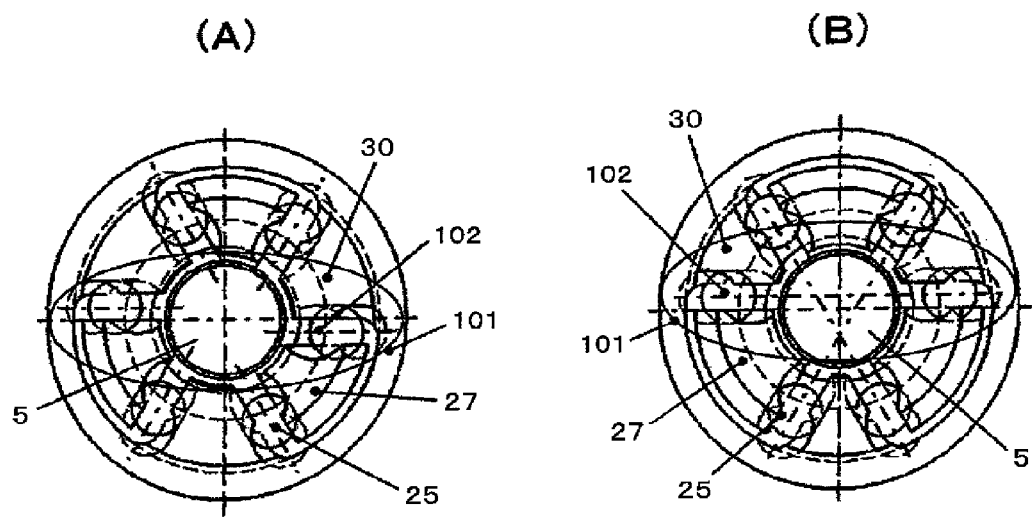
FIG. 13 shows partial elevational views showing further examples of the structure of the wobble plate type variable displacement compressor depicted in FIG. 1.

Further, as shown in FIG. 13 (A) or (B), a structure can also be employed wherein two ball guides disposed on both sides of rotational main shaft 5 approximately symmetrically relative to rotational main shaft 5 among a plurality of ball guides are referred to be a pair of ball guides, and the pair of ball guides 101 are disposed in parallel to each other, in other words, axes 102 of guide grooves formed on inner ring 27 and outer ring 30 forming the pair of ball guides 101 are disposed in parallel to each other. By this structure, because the play in the rotational direction in the rotation preventing mechanism portion is schematically decided by a relationship between the distance between a set of bottoms of the pair of guide grooves provided on inner and outer rings 27, 30 and the diameter of the balls, it becomes possible to set and manage the clearances in both ball guides simultaneously at desirable clearances, by disposing two ball guides, symmetrically disposed, in parallel to each other. Consequently, the setting and management of the clearances are facilitated, and it becomes possible to suppress the play to be small.

Figure 14:
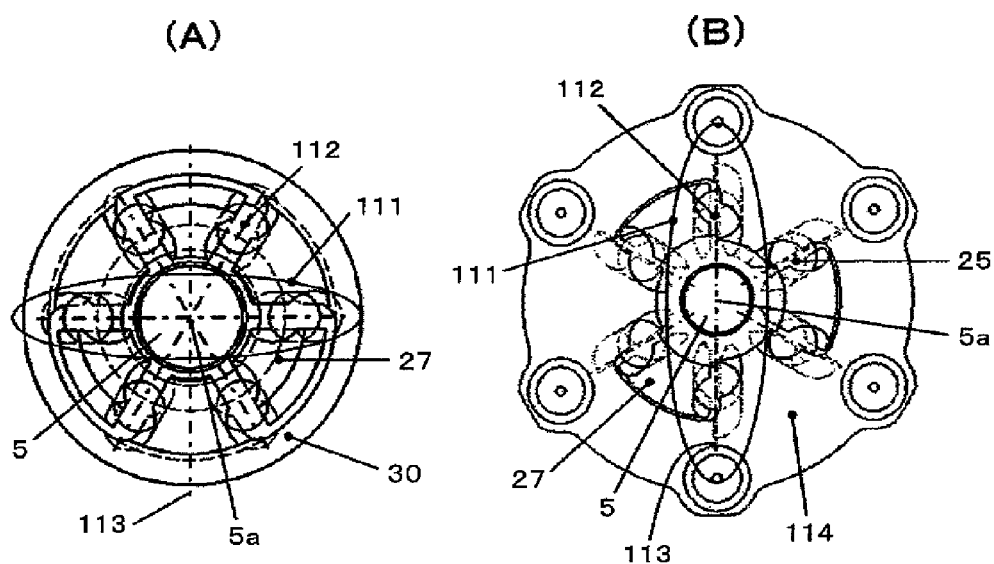
FIG. 14 shows partial elevational views showing still further examples of the structure of the wobble plate type variable displacement compressor depicted in FIG. 1.

Further, in this structure where the pair of ball guides are disposed in parallel to each other, as shown in FIG. 14(A) or (B), a structure can be employed wherein the pair of ball guides 111, which are disposed in parallel to each other, are disposed so that axes 112 of guide grooves forming the pair of ball guides are positioned on plane 113 including center axis 5a of rotational main shaft 5. In such a structure, the ball contact load is minimized without selecting the power transmission direction. Where, in FIG. 14(B), a structure of a case of wobble plate 114 integrated with an outer ring is exemplified.

INDUSTRIAL APPLICATIONS OF THE INVENTION

The wobble plate type variable displacement compressor according to the present invention can be applied to a wobble plate type variable displacement compressor used in any field, and especially, it is suitable for use in the field for vehicles highly requiring making small-sized, increase of reliability, improvement of durability and silent performance, and cost down, in particular, for use in an air conditioning system for vehicles.

EXPLANATION OF SYMBOLS

1: wobble plate type variable displacement compressor
2: housing
3: front housing
4: rear housing
5: rotational main shaft 5a: center axis
6: rotor
7: hinge mechanism
8: swash plate
9: cylinder bore
10: piston
11: connecting rod
12: wobble plate
13: suction chamber
14: valve plate
15: suction hole
16: discharge hole
17: discharge chamber
21: rotation preventing mechanism of wobble plate
22, 23, 29, 33: bearing (radial bearing)
24: sleeve
25: ball
26: guide groove of inner ring
27: inner ring
28: guide groove of outer ring
30: outer ring
31, 32: thrust bearing
41: ball guide
42, 43: axis of guide groove
44: plane passing through wobble center
45: pair of ball guides
46: axes of guide grooves formed on inner and outer rings
47: plane including center axis of rotational main shaft
50: contoured interlock mechanism
51: groove
52: pin-like member
53: swash plate minimum inclination angle regulating mechanism
54: member
55: shaft end of inner ring side of rotational main shaft
56: shaft end supporting member
57: spring
61: inner ring
62: concave portion
63: housing
64: convex portion
71: inner ring
72: flat surface portion
73: housing
74: flat surface portion
81: inner ring
82: flat surface portion
83: housing
84: flat surface portion
91: pair of ball guides
92: power transmission direction of outer ring
93: one ball guide
94: axis of guide groove
95: plane including center axis of rotational main shaft
96: power transmission direction of inner ring
101: pair of ball guides
102: axis of guide groove
111: pair of ball guides
112: axis of guide groove
113: plane including center axis of rotational main shaft
114: wobble plate integrated with outer ring

The invention claimed is:

1. A wobble plate type variable displacement compressor having pistons inserted reciprocally into cylinder bores, a swash plate rotated together with a rotational main shaft and supported changeably in angle relative to said main shaft, a wobble plate which is connected to said pistons, in which a rotational movement of said swash plate is converted into a wobble movement of said wobble plate, and which transmits said wobble movement to said pistons to reciprocate said pistons, and a wobble plate rotation preventing mechanism configured to prevent rotation of said wobble plate, wherein:
said wobble plate rotation preventing mechanism comprises (a) an inner ring provided in a housing movably in an axial direction while being prevented from rotating via an inner ring rotation preventing mechanism, the inner ring supporting said rotational main shaft at an inner diameter portion of the inner ring to rotate relatively and to move relatively in an axial direction and having a plurality of guide grooves for guiding a plurality of balls provided for power transmission, (b) a sleeve functioning as a wobble central member of said wobble movement of said wobble plate, provided on said rotational main shaft to rotate relatively thereto and to move in an axial direction and engaged with said inner ring movably in an axial direction together with said inner ring, (c) an outer ring having a plurality of guide grooves for guiding said balls at positions opposing respective guide grooves of said inner ring, supported on said sleeve wobblingly, and connected with said wobble plate on an outer circumference side of said outer ring, and (d) a plurality of balls held by said guide grooves formed in said inner ring and said guide grooves formed in said outer ring at a condition of opposing each other and performing power transmission by being compressed between said guide grooves,
said inner ring rotation preventing mechanism formed in said housing is constructed as a contoured interlock mechanism formed between an outer circumference of said inner ring and an inner circumference of said housing, and
a swash plate minimum inclination angle setting mechanism, comprising: (i) at least one groove on a circumference of said inner ring, said groove extending parallel to a rotational axis and having an end wall extending perpendicular to said rotational axis, and (ii) a pin extending parallel to said rotational axis and mounted on said housing, such that an angle of inclination of the swash plate is at its minimum when an end of the pin abuts said end wall.

2. The wobble plate type variable displacement compressor according to claim 1, wherein said pin is provided to an intermediate member fixed in said housing.

3. The wobble plate type variable displacement compressor according to claim 1, wherein a shaft end supporting member is provided in said housing for supporting an inner ring-side shaft end of said rotational main shaft in an axial direction.

4. The wobble plate type variable displacement compressor according to claim 1, wherein a spring is interposed between axially confronting surfaces of sides of said inner ring and said housing for urging said inner ring in a direction for increasing an inclination angle of said swash plate.

5. The wobble plate type variable displacement compressor according to claim 1, wherein said outer ring is formed integrally with said wobble plate.

6. The wobble plate type variable displacement compressor according to claim 1, wherein said guide grooves opposing each other of said inner ring and said outer ring of said wobble plate rotation preventing mechanism are formed at a relative angle of 30 to 60 degrees relative to a center axis of said rotational main shaft, and guide grooves opposing each other for forming a single ball guide are disposed so as to be symmetric relative to a plane perpendicular to said main shaft and passing through a wobble center of said wobble plate at a condition where a relative angle between an axis of said inner ring and an axis of said outer ring is zero.

7. The wobble plate type variable displacement compressor according to claim 6, wherein two ball guides adjacent to each other among a plurality of ball guides of said wobble plate rotation preventing mechanism are referred to be a pair of ball guides, and said pair of ball guides are disposed in parallel to each other.

8. The wobble plate type variable displacement compressor according to claim 7, wherein said pair of ball guides disposed in parallel to each other are disposed symmetrically relative to a plane including a center axis of said rotational main shaft.

9. The wobble plate type variable displacement compressor according to claim 7, wherein a guide groove forming one ball guide of said pair of ball guides, which are disposed in parallel to each other, is disposed so that its axis is positioned on a plane including a center axis of said rotational main shaft.

10. The wobble plate type variable displacement compressor according to claim 6, wherein two ball guides disposed on both sides of said rotational main shaft approximately symmetrically relative to said rotational main shaft among a plurality of ball guides of said wobble plate rotation preventing mechanism are referred to be a pair of ball guides, and said pair of ball guides are disposed in parallel to each other.

11. The wobble plate type variable displacement compressor according to claim 10, wherein said pair of ball guides, which are disposed in parallel to each other, are disposed so that axes of guide grooves forming said pair of ball guides are positioned on a plane including a center axis of said rotational main shaft.

* * * * *